Figure 1:
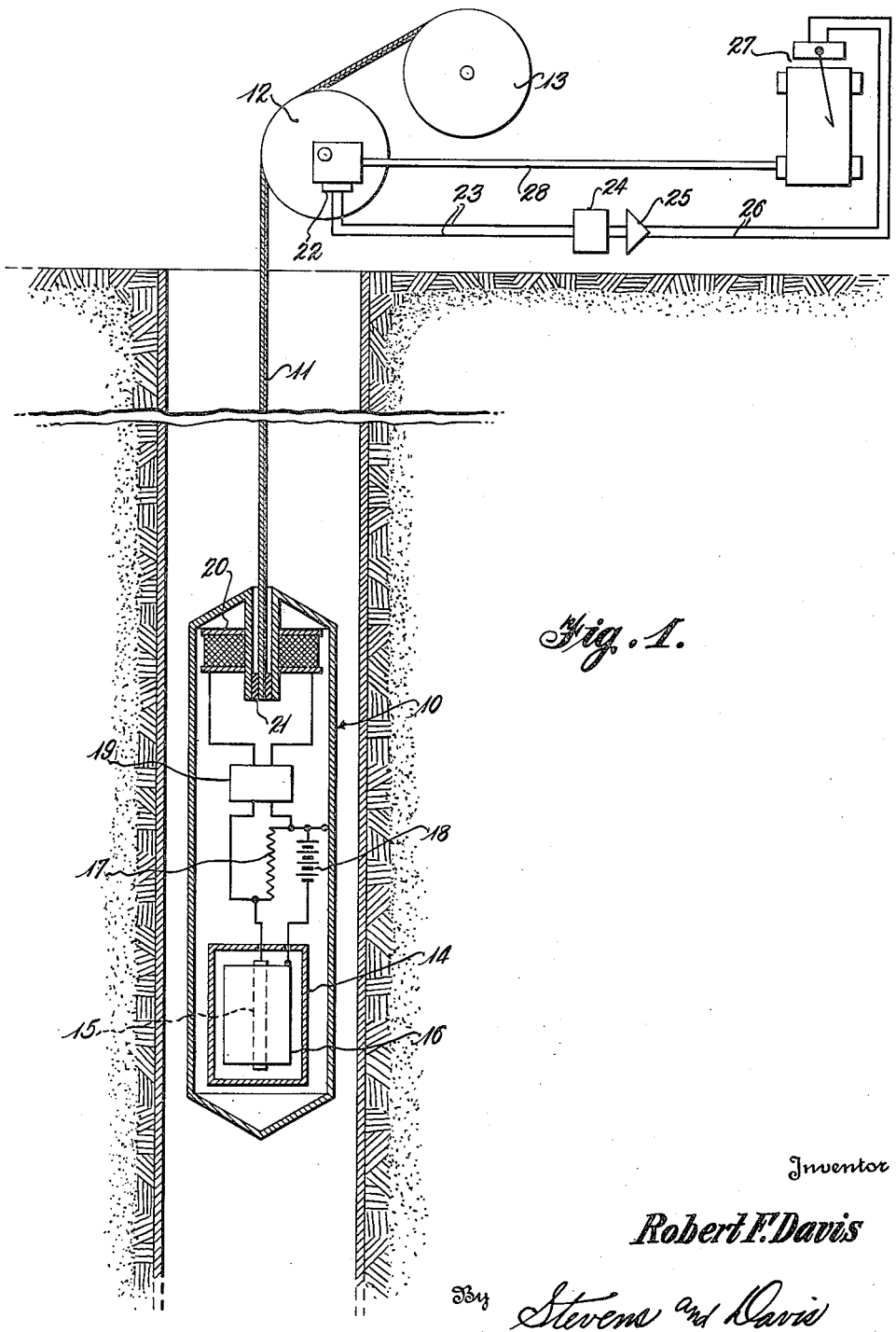

June 9, 1942.　　　　R. F. DAVIS　　　　2,285,809
WELL SURVEYING METHOD AND APPARATUS
Filed April 4, 1940　　　2 Sheets-Sheet 1

Inventor
Robert F. Davis
By Stevens and Davis
Attorneys

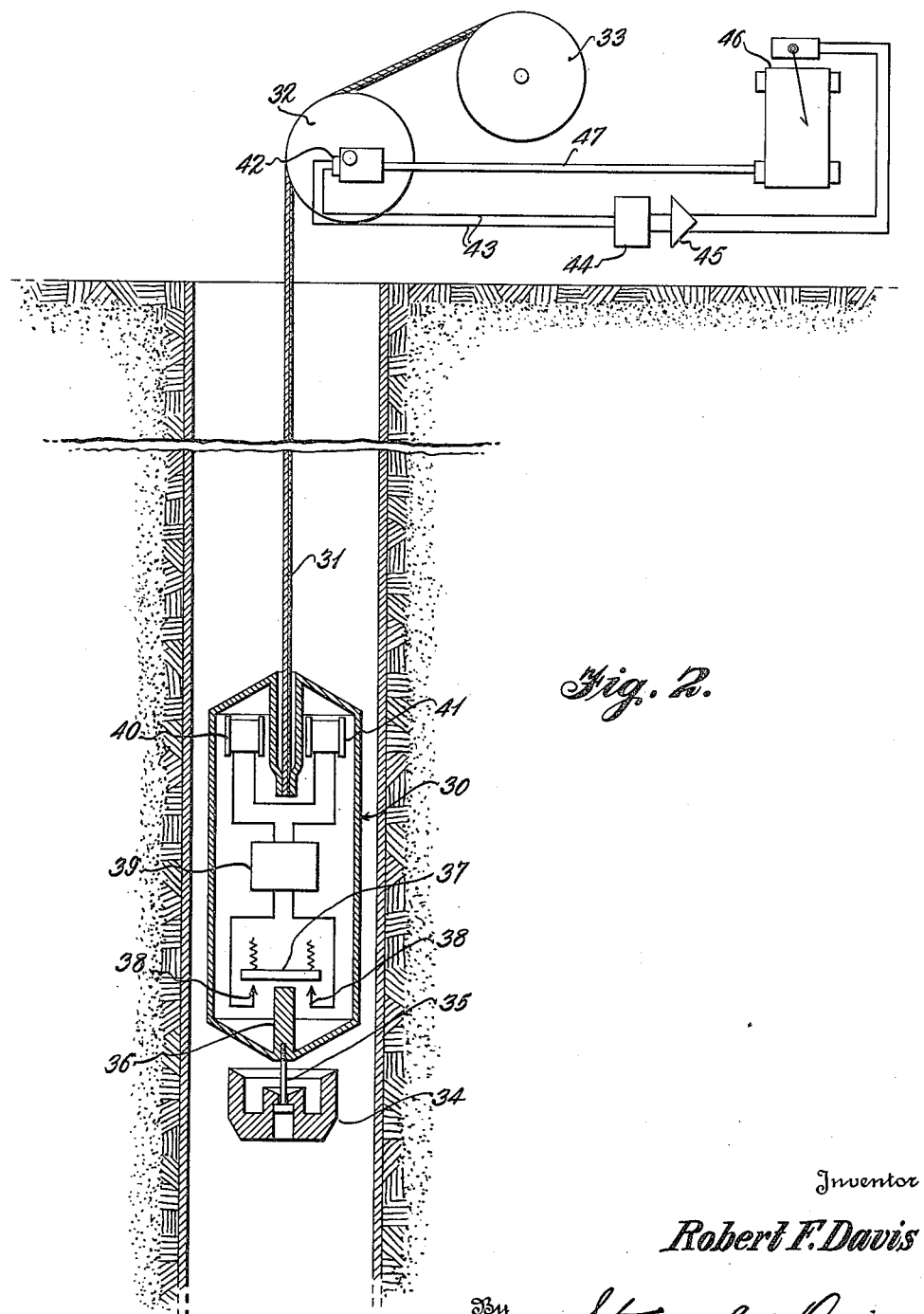

Patented June 9, 1942

2,285,809

UNITED STATES PATENT OFFICE 2,285,809

WELL SURVEYING METHOD AND APPARATUS

Robert F. Davis, Washington, D. C., assignor to Well Surveys, Incorporated, Tulsa, Okla., a corporation of Delaware Application April 4, 1940, Serial No. 327,929

18 Claims. (Cl. 250—83.6)

This invention relates to the art of subsurface geophysical prospecting by the lowering of measuring instruments into well bores, drill holes or the like and the recording of the measurements there made by surface equipment. More particularly this invention is concerned with the transmission of the measurements made in the well bores, from the measuring instruments in the wells to the recording equipment located on the surface of the earth.

Prior to this invention many devices have been proposed for lowering into drill holes, well bores and the like to make various types of measurements indicative either of the nature of the strata surrounding the well bore, or of the physical character of the well bore itself. As a few examples of such devices, mention may be made of the electrical resistivity measuring devices commonly used to measure the relative resistivity of various portions of the formations lying alongside of well bores, numerous devices used to determine deviations from vertical well bores, devices for indicating the depth of water or other fluid in the wells, devices for measuring the natural radioactivity of the strata surrounding wells and even devices for exposing the formations around the well to artificially produced radiations and measuring the scattering of these radiations or the secondary radiations caused thereby.

In all of these devices and in many other devices of a generally similar nature it has been necessary to transmit the information obtained by the instrument in the well to the recording mechanism on the surface. For this purpose it has heretofore been common to use a supporting cable for the instrument in the well which cable contains a plurality of insulated conductors over which electrical signals are transmitted from the instrument to the surface. Great difficulty has arisen in connection with the practical use of such cables, however, for the pressures encountered by the cable in the well and the oil, abrasion, and other deteriorating influences to which it is subjected in the course of normal use are such that only an extremely expensive and very carefully constructed cable can withstand the treatment for even a short time. Even the best cables that have been constructed for this purpose have a relatively short life and the expense of replacing them is quite large.

According to this invention, in its broadest aspect, that difficulty is avoided by sending the signal or indication from the measuring instrument in the well to the surface through the supporting cable, not as an electrical vibration but as a mechanical vibration. In cases where the signal is merely a signal and need convey no indication of magnitude, the signal from the detecting or measuring device may be used simply to initiate or stop the transmission of a mechanical vibration or a series of mechanical vibrations. Where, however, an actual measurement is being taken in the well and the magnitude of this measurement needs to be transmitted to the surface it has been found that this can be accomplished by modulating the frequency of the vibration to be transmitted, in accordance with the magnitude of the measurement to be transmitted. Alternatively, the magnitude of the measurement may be transmitted to the surface by periodically interrupting a continuous vibration transmitted to the surface and governing the frequency of interruption in accordance with the magnitude of the measurement to be transmitted.

A more complete understanding of the details of the present invention and of its numerous advantages may be obtained by a study of the following detailed description of two embodiments which embodiments are also illustrated in the appended drawings. It is to be understood, however, that these are but two illustrative embodiments and in no way limit the applicability of the principles of this invention to other types of measurements than those illustrated or exclude any one of a great number of modified forms that may readily be devised once the principles of the invention are understood.

In the drawings,

Figure 1 is a diagrammatic illustration of a device for measuring the natural radioactivity of subsurface formations and transmitting the results of the measurements to the surface in accordance with the principles of this invention; and Figure 2 is a diagrammatic illustration of a device for locating the bottom of a well so that unnecessary lengths of cable will not be lowered into the well after the bottom has been reached. Again, the information is transmitted to the surface in accordance with the principles of the present invention.

As illustrated in Figure 1 a device for measuring continuously the natural radioactivity of the formations adjacent a drill hole may comprise a main casing or capsule 10 suspended at the lower end of an ordinary steel cable 11 which is supported at its upper end by a measuring wheel 12 and a cable reel 13, the latter being driven by any suitable source of power, not shown, to raise and lower the measuring capsule in the well.

Within the measuring capsule 10 may be positioned the usual ionization chamber 14 preferably filled with argon at a pressure of around 1500 to 2000 pounds per square inch and containing a pair of electrodes 15 and 16 which are connected through the walls of the casing to a resistor 17 and a battery 18. The battery 18 and the resistor 17 are connected in series with the two electrodes so that the battery will furnish a potential across the electrodes and the voltage drop across the resistor will be proportional to the current flow between the electrodes in the chamber. The positive side of the battery is preferably grounded to the casing 10 and an oscillator 19, the frequency of which is modulated by the input, has its input connected across the resistor 17 so that the frequency of the output of the oscillator will be proportional to the voltage drop across the resistor 17 and hence proportional to the ionization in the chamber 14.

To the output of the oscillator may be connected an electromagnet 20 and the casing and magnet are preferably so arranged that the magnets can be inside of the casing and yet act on the supporting cable 11 at a point above that at which the casing is suspended from it. This may be accomplished as illustrated, by forming a recess in the upper end of the casing and anchoring the supporting cable to the casing at the bottom of the recess. The electromagnet 20 can then be placed high in the casing where it will surround the cable above the point of suspension. By proper choice of materials for the wall between the electromagnet and the suspending cable interference with the action of the magnet on the cable can be avoided and the cable given the desired longitudinal mechanical oscillatory movement corresponding to the electrical oscillations impressed on the electromagnet 20. Preferably the cable 11 is resiliently mounted in the casing 10 as shown at 21 so that there will be no rigid connection between cable and casing to resist the oscillations of the cable.

It is desirable to make the frequency range within which the oscillator 19 operates such that no interference will be experienced due to mechanical vibrations accidentally set up by the cable or other sources and not such that the natural frequency of oscillation of the cable will tend to interfere, but this can be easily determined by trial for any particular arrangement. It cannot be given in advance, however, due to the differences in the weights of the measuring instruments that may be employed, the differences in the sizes of the cables that may be employed, and the differences in the depths to which the instrument may be lowered. In general, however, frequencies of from 500 to 1000 cycles should be sufficiently high to avoid any difficulty from these sources.

At the surface a microphone 22 is positioned to bear against the measuring wheel supporting structure so as to pick up the vibrations from the cable. From the microphone 22 the generated currents pass through connections 23 to a filter 24 that removes frequencies outside the band in which the oscillator 19 is adapted to work and the currents then pass on to an amplifier 25 and finally through leads 26 to a recorder 27, the recording pen of which is moved not in response to the amplitude of the incoming currents but in response to their frequency changes. For operating the recorder pen any one of the usual types of frequency meter mechanisms may be used.

In order to correlate the recordings made on recorder 27 with the depth at which they are made the recording tape may be driven through a mechanical connection 28 from the measuring wheel 12. This connection can of course be electrical rather than mechanical and in most instances in practical use it has been found desirable to use the well known "Selsyn" transmission system which is an electrical system.

The transmission system above described may obviously be varied in many ways and still be within the spirit of this invention. Likewise, it may be used with many types of measuring instruments, for example, a measuring instrument of the type shown by any of the following: Patent 2,133,776, granted October 18, 1938, to John C. Bender; application Serial Number 141,365 filed May 7, 1937, by Serge A. Scherbatskoy; application Serial Number 141,364 filed May 7, 1937, by Serge A. Scherbatskoy; application Serial Number 239,781 filed November 10, 1938, by Robert E. Fearon; application Serial Number 232,905 filed October 1, 1938, by Jacob Neufeld. The particular type of measurement that is adapted to be made by the instrument shown in Figure 1 is described in more detail in application Serial Number 161,350 filed August 27, 1937, by Jacob Neufeld.

Figure 2 has been provided for the purpose of illustrating the application of the present transmission system to a different type of determination, and the determination of the location of the bottom of a well has been chosen for this purpose. At the same time this figure illustrates a modification of the method of mechanically transmitting the vibrations up the supporting cable.

As in Figure 1 a casing 30, in Figure 2, is lowered into a well at the bottom of an ordinary steel supporting cable 31 supported on a measuring wheel 32 and raised or lowered by a cable drum 33 driven by a suitable source of power not shown. From the bottom of the casing 30 a permanent magnet member 34 is suspended by a bolt 35 of brass or some other nonmagnetic material so that it is some distance from the bottom of the casing when the casing and magnet are suspended by the supporting cable but can rise to a position adjacent the bottom of the casing when the instrument reaches the bottom of the well and comes to rest upon the magnet member.

Within the casing and at the bottom thereof where it will be acted upon strongly by the magnet member when the magnet member is close to the casing is a pole piece 36 which extends upwardly into the casing to a position adjacent a spring supported contacting bar 37 of iron or other material which will be attracted by magnetism. Contacts 38 are provided below this bar so that when the magnet member 34 strikes the bottom of a well and is moved up into a position adjacent the casing, the pole piece 36 will be activated to pull the contacting member 37 down against the contacts 38 to complete a circuit. This circuit is connected to actuate an oscillator 39 that operates at a fixed frequency. The oscillator 39 in turn actuates a pair of magnet coils 40 and 41 having horizontal axes and positioned in the upper part of the casing 30 on opposite sides of the supporting cable 31 at a point above that at which it is attached to the casing. As in Figure 1, the supporting cable 31 is attached to the casing at the bottom of a recess so that this can be accomplished. The vibrations impressed on the cable by this construction are lateral rather than longitudinal as in Figure 1.

At the surface a microphone pick-up 42 is so placed as to receive through the measuring wheel trunnions any vibrations that are imparted to the cable 31. The vibrations, converted into electrical vibrations by the pick-up, pass through leads 43 to a filter 44 which filters out any frequency other than that generated by oscillator 39. From the filter the currents pass to an amplifier 45 and then to a recorder 46. No discrimination between frequencies is necessary in this recorder and the recorder can be of the ordinary type wherein the recording pen is operated in response to the magnitude of the incoming currents. In order to correlate the recording of the bottom indicating signal with a measurement of the depth at which the device was operating when the signal was received, the recorder may be connected by mechanical connection or electrical connection or otherwise so that the tape operates in accordance with the motions of the measuring wheel 32. In the drawings this has been shown as a mechanical connection 47. In practice, however, it has been found desirable to use an electrical connection such as the "Selsyn" transmission system.

Many modifications may obviously be made within the scope of this invention. For example, measurements of several different types may be made, simultaneously, and transmitted by mechanical vibrations over the same cable using a different range of frequencies for each measurement or, for example, the two instruments herein illustrated may be suspended from a single cable with the bottom locating device lowermost, and the bottom determining device connected to stop the generation of vibrations by the radiation measuring device. Thus the cessation of vibration will indicate the reaching of the bottom of the well.

I claim:

1. A method of geophysical prospecting that comprises obtaining measurements of radiation from surrounding geological strata in a well bore or similar opening in the ground, converting the measurements into proportionally related mechanical vibrations, transmitting the mechanical vibrations to the surface and recording at the surface the measurements from the vibrations.

2. A method of geophysical prospecting that comprises obtaining measurements of radiation from surrounding geological strata in a well bore or similar opening in the ground, converting the measurements into proportionally related mechanical vibrations, transmitting the mechanical vibrations to the surface and recording at the surface the measurements from the vibrations in correlation with a determination of the depth at which the measurements were obtained.

3. A method of geophysical prospecting that comprises obtaining measurements of radiation from surrounding geological strata in a well bore or similar opening in the ground, continuously generating mechanical vibrations at the place where the measurements are obtained, altering the vibrations with indications of the measurements, transmitting the vibrations to the surface, and recording the measurements from the vibrations.

4. A method of geophysical prospecting that comprises obtaining measurements of radiation from surrounding geological strata in a well bore or similar opening in the ground, continuously generating mechanical vibrations at the place where the measurements are obtained, altering the frequency of the mechanical vibrations in accordance with the measurements obtained, transmitting the mechanical vibrations to the surface of the earth and recording the measurements derived from the mechanical vibrations.

5. A method of geophysical prospecting that comprises determining the natural radioactivity of formations adjacent a well bore or similar opening in the ground at various depths in the opening, continuously generating mechanical vibrations at the place where the determinations are being made, altering the frequency of the vibrations in accordance with the measurement, transmitting the altered mechanical vibrations to the surface of the earth, simultaneously determining the position of the measuring instrument in the opening and recording the alteration of the mechanical vibrations in correlation with determination of depth.

6. A method of geophysical prospecting that comprises lowering a determining device into a deep well or other deep opening in the ground until it reaches the bottom of the opening, thereupon sending a mechanical vibration to the surface of the earth, determining the position of the device in the earth and recording the mechanical vibrations and the position of the device in correlation.

7. A device for geophysical prospecting that comprises means for measuring radiation from adjacent formations and adapted to be lowered into a drill hole or other opening in the earth, means adapted to be lowered therewith and to generate mechanical vibrations, means to alter said vibrations in accordance with the measurements gathered, means to transmit the vibrations to the surface of the earth, and means to record the alterations of said mechanical vibrations at the surface of the earth.

8. In a device for geophysical prospecting which includes means for measuring radiation from surrounding geological strata in a drill hole or other opening in the earth, means to support the measurement gathering means in the opening, and means to record the measurements gathered on the surface, the improvement that comprises means to transmit the measurements from the measurement gathering instrument to the recorder including means to convert the measurements into proportionally related mechanical vibrations at the measurement gathering means and means to reconvert the mechanical vibrations into indications of the measurements at the surface.

9. A method of geophysical prospecting that comprises suspending an instrument upon a metallic cable within a well bore; measuring radiation from surrounding geological strata with said instrument; converting the measurements into longitudinal mechanical vibrations of the cable upon which the instrument is suspended; receiving the vibrations at the surface from the cable; and recording the measurements from the received vibrations.

10. A method of geophysical prospecting that comprises suspending an instrument upon a metallic cable within a well bore; measuring radiation from surrounding geological strata with said instrument; converting the measurements into longitudinal mechanical vibrations of the cable upon which the instrument is suspended; receiving the vibrations at the surface, from the cable; and recording the measurements from the received vibrations in correlation with a determination of the depth at which the measurements were made.

11. A method of geophysical prospecting that comprises suspending an instrument upon a metallic cable within a well bore; measuring radiation from surrounding geological strata with said instrument; converting the measurements into transversal mechanical vibrations of the cable upon which the instrument is suspended; receiving the vibrations at the surface from the cable; and recording the measurements from the received vibrations.

12. A method of geophysical prospecting that comprises suspending an instrument upon a metallic cable within a well bore; measuring radiation from surrounding geological strata with said instrument; converting the measurements into transversal mechanical vibrations of the cable upon which the instrument is suspended; receiving the vibrations at the surface, from the cable; and recording the measurements from the received vibrations in correlation with a determination of the depth at which the measurements were made.

13. A device for geophysical prospecting that comprises an instrument, capable of being moved within a well bore, for measuring while within the bore radiation from surrounding geological strata; a metallic cable for supporting the instrument within the bore; means for creating mechanical vibrations in the cable proportionally related to measurements made by the instrument; means at the surface for sensing mechanical vibrations in the cable; and means at the surface for recording the measurements from the sensed vibrations.

14. A device for geophysical prospecting that comprises an instrument, capable of being moved within a well bore, for measuring while within the bore radiation from surrounding geological strata; a magnetically sensitive metallic cable for supporting the instrument within the bore; means at the instrument comprising magnets controlled by the instrument for creating mechanical vibrations in the cable proportionally related to measurements made by the instrument; means at the surface for sensing mechanical vibrations in the cable; and means at the surface for recording the measurements from the sensed vibrations in correlation with measurements of the depth at which the radiation measurement was made.

15. A device for geophysical prospecting that comprises an instrument, capable of being moved within a well bore, for measuring while within the bore radiation from surrounding geological strata; a magnetically sensitive metallic cable for supporting the instrument within the bore; means at the instrument comprising magnets controlled by the instrument for creating longitudinal mechanical vibrations in the cable proportionally related to measurements made by the instrument; means at the surface for sensing longitudinal mechanical vibrations in the cable; and means at the surface for recording the measurements from the sensed vibrations in correlation with measurements of the depth at which the radiation measurement was made.

16. A device for geophysical prospecting that comprises an instrument, capable of being moved within a well bore, for measuring while within the bore radiation from surrounding geological strata; a magnetically sensitive metallic cable for supporting the instrument within the bore; means at the instrument comprising magnets controlled by the instrument for creating transversal mechanical vibrations in the cable proportionally related to measurements made by the instrument; means at the surface for sensing transversal mechanical vibrations in the cable; and means at the surface for recording the measurements from the sensed vibrations in correlation with measurements of the depth at which the radiation measurement was made.

17. Method of transmitting data from a subsurface prospecting instrument to surface apparatus that comprises creating an electrical oscillation at the prospecting instrument, altering said oscillation in accordance with data from said instrument, translating the electrical oscillation into mechanical vibrations, transmitting the vibrations to the surface, analyzing the vibrations at the surface to obtain the desired data, and operating the indicating apparatus in accordance therewith.

18. Method of transmitting data from a subsurface prospecting instrument within a well bore to surface apparatus that comprises producing an electrical current at the prospecting instrument, altering characteristics of said current in accordance with data from said instrument, creating an electrical oscillation, altering said oscillation in accordance with alterations in said current, translating the electrical oscillation into mechanical vibrations, transmitting the vibrations to the surface, analyzing the vibrations at the surface to obtain the desired data, and operating the indicating apparatus in accordance therewith.

ROBERT F. DAVIS.